United States Patent
Stephens

(10) Patent No.: US 8,739,015 B2
(45) Date of Patent: May 27, 2014

(54) PLACING MULTIPLE FILES AS A CONTACT SHEET

(75) Inventor: David C. Stephens, Shoreline, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1040 days.

(21) Appl. No.: 12/233,811

(22) Filed: Sep. 19, 2008

(65) Prior Publication Data

US 2014/0033005 A1 Jan. 30, 2014

(51) Int. Cl.
*G06F 17/00* (2006.01)
*G06F 3/033* (2013.01)

(52) U.S. Cl.
USPC ............ 715/200; 715/205; 715/253; 715/863

(58) Field of Classification Search
CPC .. H04N 1/00196; G06T 11/60; G06T 3/4038; G06F 17/24; G03B 37/00
USPC .................................................. 715/200, 204
See application file for complete search history.

(56) References Cited

U.S. PATENT DOCUMENTS

| | | | |
|---|---|---|---|
| 6,453,078 B2 * | 9/2002 | Bubie et al. | 382/305 |
| 6,687,404 B1 | 2/2004 | Hull et al. | |
| 7,120,868 B2 | 10/2006 | Salesin et al. | |
| 7,134,084 B1 | 11/2006 | Rashid et al. | |
| 7,240,294 B2 | 7/2007 | Fitzsimons et al. | |
| 7,339,598 B2 | 3/2008 | Schowtka et al. | |
| 2002/0046245 A1 | 4/2002 | Hillar et al. | |
| 2002/0051205 A1 | 5/2002 | Teranishi et al. | |
| 2003/0117502 A1 * | 6/2003 | Heiles | 348/231.2 |
| 2004/0179115 A1 * | 9/2004 | Tomat et al. | 348/231.2 |
| 2005/0210414 A1 * | 9/2005 | Angiulo et al. | 715/838 |
| 2006/0209214 A1 | 9/2006 | Fader et al. | |
| 2007/0003166 A1 | 1/2007 | Berkner | |
| 2009/0144368 A1 * | 6/2009 | Andersen | 709/205 |

OTHER PUBLICATIONS

Barbara Obermeier, Photoshop® All-in-One Desk Reference for Dummies®, May 29, 2007, John Wiley & Sons, pp. 665-669.*
Keith Gilbert, "Quick and Easy Photo Contact Sheets," Jun./Jul. 2007, InDesign Magazine 18, pp. 1-10.*
"Andromeda Software, Inc.", [Online]. Retrieved from the Internet: <URL: http://web.archive.org/web/20061017080527/http:/www.andromeda.com/main/phototilerpg2.php>, (Archived Oct. 17, 2006), 1 pg.

* cited by examiner

*Primary Examiner* — Doug Hutton, Jr.
*Assistant Examiner* — Ariel Mercado
(74) *Attorney, Agent, or Firm* — Schwegman Lundberg & Woessner, P.A.

(57) ABSTRACT

Various embodiments include one or more of systems, methods, and software for placing multiple files as a contact sheet, such as image files within an electronic document. A selection of electronic files is received along with a an area input. The area input defines an area to place a graphical representation of at least one of the selected electronic files within an electronic file being authored. Graphical representations of the selected electronic files may then be placed in the defined area.

16 Claims, 7 Drawing Sheets

PLACING MULTIPLE FILES AS A CONTACT SHEET

BACKGROUND INFORMATION

A contact sheet is a document with multiple images arranged in rows and columns. To create a contact sheet in a document within computer applications, users select image files and place individual image files, one at a time into a document. The image file is placed at a resolution of the image file. Each image file, once placed, must then be resized to appropriate dimensions desired by the user. Creating a contact sheet including many images is a lengthy process.

DETAILED DESCRIPTION

As illustrated in the figures and describe below, various embodiments include one or more of systems, methods, and software to receive a selection of electronic files to import and place in a document as a contact sheet. The placing of images in some such embodiments includes placing images at one time in response to input identifying an area and defining a size and spacing of where the images are to be placed. These embodiments, and others described herein, provide mechanisms that allow for rapid generation of contact sheet arrangements of electronic files, such as image files, within a document.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable medium such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
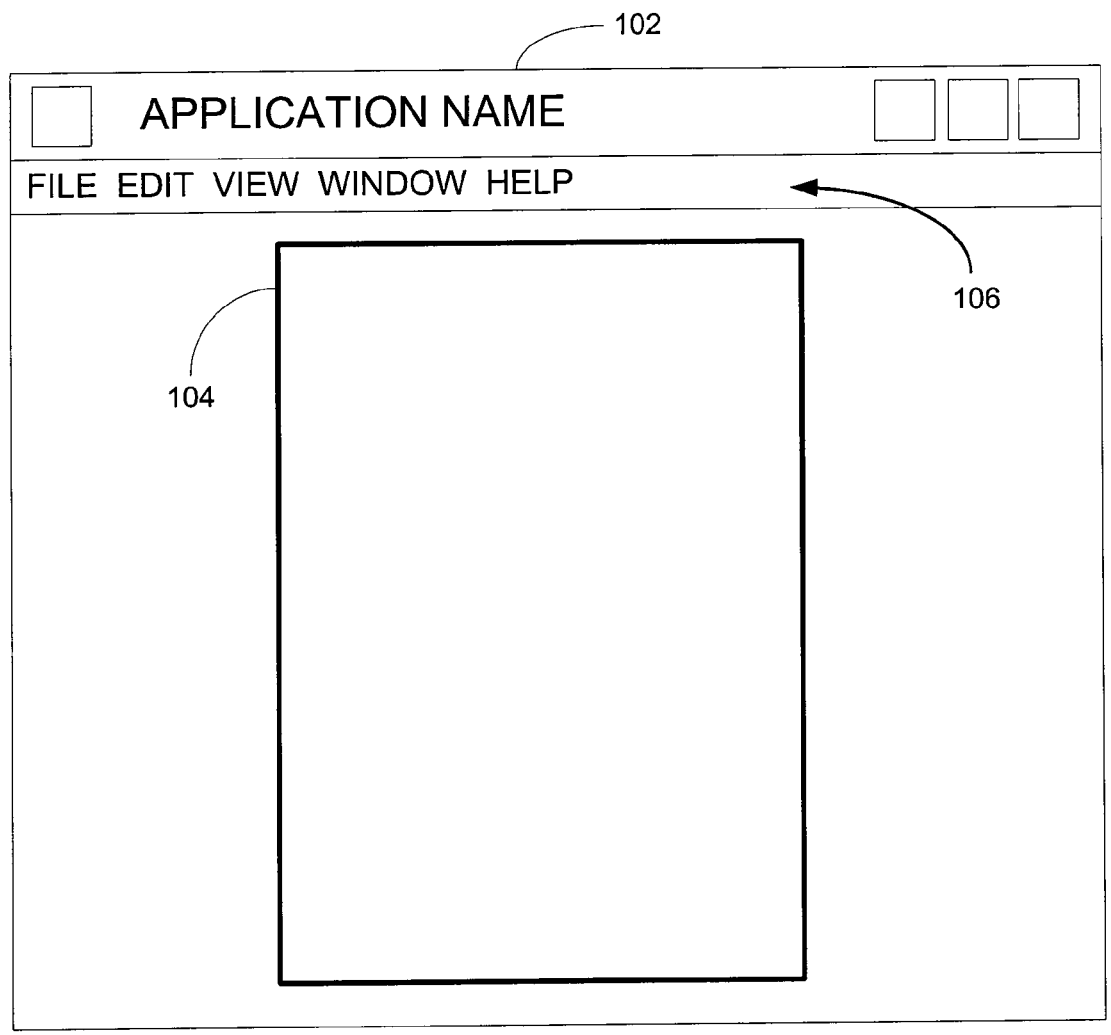
FIG. 1 is an illustration of a document authoring user interface of a document authoring application according to an example embodiment.

FIG. 1 is an illustration of a document authoring user interface 102 of a document authoring application, according to an example embodiment. In some embodiments, the document authoring application is a desktop publishing application such as the Adobe® InDesign® application available from Adobe Systems, Incorporated of San Jose, Calif. However, in other embodiments, the document authoring application may be a word processing application, a web page authoring application, a presentation application, or other application within which a user may desire to import electronic files, such as images, for placement as a contact sheet.

The document authoring user interface 102 includes menu items 106 and displays a document 104 being authored. To add electronic files to the document 104, a user may select one of the menu items 106, a popup menu item (not shown), input a combination of keystrokes on a keyboard, or through other mechanisms, which may be triggered using a keyboard, a gesture input device such as a mouse, or other input device. Upon receipt of an action signifying a desire or intent to add electronic files to the document 104, the file listing user interface 202 of FIG. 2 is displayed.

Figure 2:
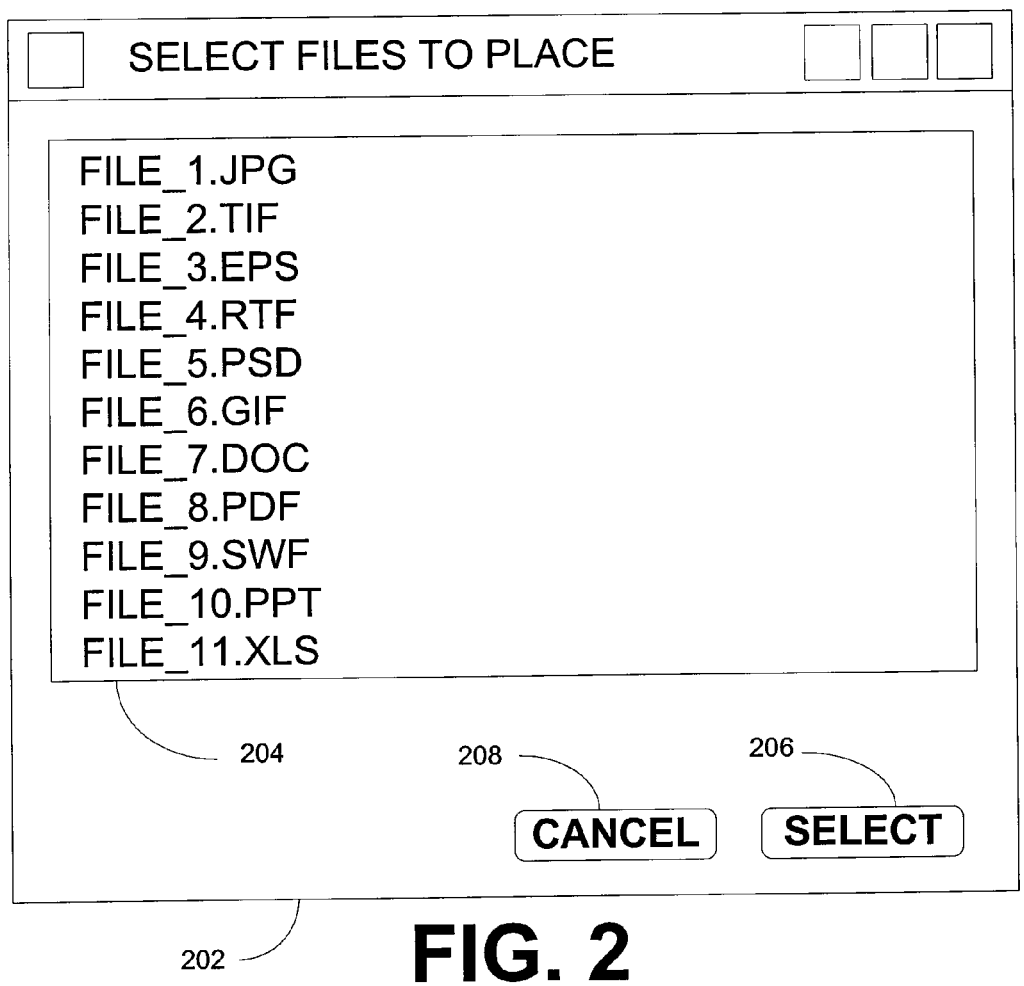
FIG. 2 is an illustration of file listing user interface of a document authoring application for importing electronic files into a document according to an example embodiment.

FIG. 2 is an illustration of file listing user interface 202 of a document authoring application for importing electronic files into a document according to an example embodiment. The file listing user interface 202 includes a file listing 204 of electronic files accessible on or by a computing device upon which the document authoring application is operating. These files may be physically stored on the local computing device, but may also be stored on other computing devices accessible over one or more networks such as a local area network, the Internet, or other network types. The electronic files, in some embodiments, are electronic image files in formats such as JPEG, GIF, BMP, TIFF, and other electronic image file formats. In some further embodiments, the electronic files may be of other formats. These other formats may include one or more of presentation file formats such as the Microsoft® PowerPoint® file format, page description language formats such as the Adobe® PDF file format, a word processing document format, a desktop publishing file format, a spreadsheet file format, a moving picture file format such as MPEG, or other file format of electronic files a user may want to import and place within a document.

The file listing user interface 202 is operable to present the file listing 204 and receive a selection of electronic files presented in the file listing 204. Upon receipt of a selection of electronic files, the file listing user interface is further operable to capture a representation of the selection in memory of the computing device upon receipt of selection of a select action button 206 or other triggering event, such as an ENTER key stroke on a keyboard. Upon selection of the select action button 206, the selected electronic files may be imported to a data structure of the document 104 illustrated in FIG. 1. In other embodiments, the selected electronic files may be held or referenced in memory for access by the document authoring user interface for later importing and placement of the selected electronic files. The file listing user interface 202 is then exited and the user is returned to the document authoring user interface 102 of FIG. 1. The file listing user interface 202 also includes a cancel action button 208 that may be selected in a similar fashion as the select action button 206 to cancel the process to add electronic files to the document 104 of FIG. 1. Selection of the cancel action button 206 returns the user to the document authoring user interface 102 of FIG. 1.

Upon return to the document authoring user interface 102 of FIG. 1 following selection of electronic files in the file listing user interface 202 of FIG. 2, the document authoring user interface is in a state to allow a user to add the selected electronic files to the document 104. To add the selected electronic files to the document 104, the user triggers the electronic file placing functionality. The trigger may be received from the user in one or more ways. One trigger may include selection of a menu item 106. Another trigger may be receipt of one or more keystrokes on a keyboard. For example, a user of a PC-based computing device may trigger the electronic file placing functionality by providing a trigger input by simultaneous keystrokes of the CNTL+SHIFT keys of a keyboard. The trigger input on a Mac-based computing device may trigger the electronic file placing functionality by providing the trigger input with simultaneous keystrokes of the CMD+SHIFT keys of a keyboard. In some embodiments, upon receipt of the trigger input, a pointer of a gesture tool, such as a mouse, changes from a default pointer to a pointer indicative that the document authoring user interface 102 is in a state for placement of the electronic files.

In other embodiments, electronic files may be selected in another user interface outside of a computer application that provides the document authoring user interface 102 of FIG. 1. For example, electronic files may be selected for import and placement into the document authoring user interface 102 within a file listing user interface of an operating system, such as the Windows Explorer user interface in a Microsoft Windows computing environment. The selected files may then be imported and ready for placement in the document authoring user interface 102 through a drag-and-drop operation using a gesturing device such as a mouse.

Figure 3:
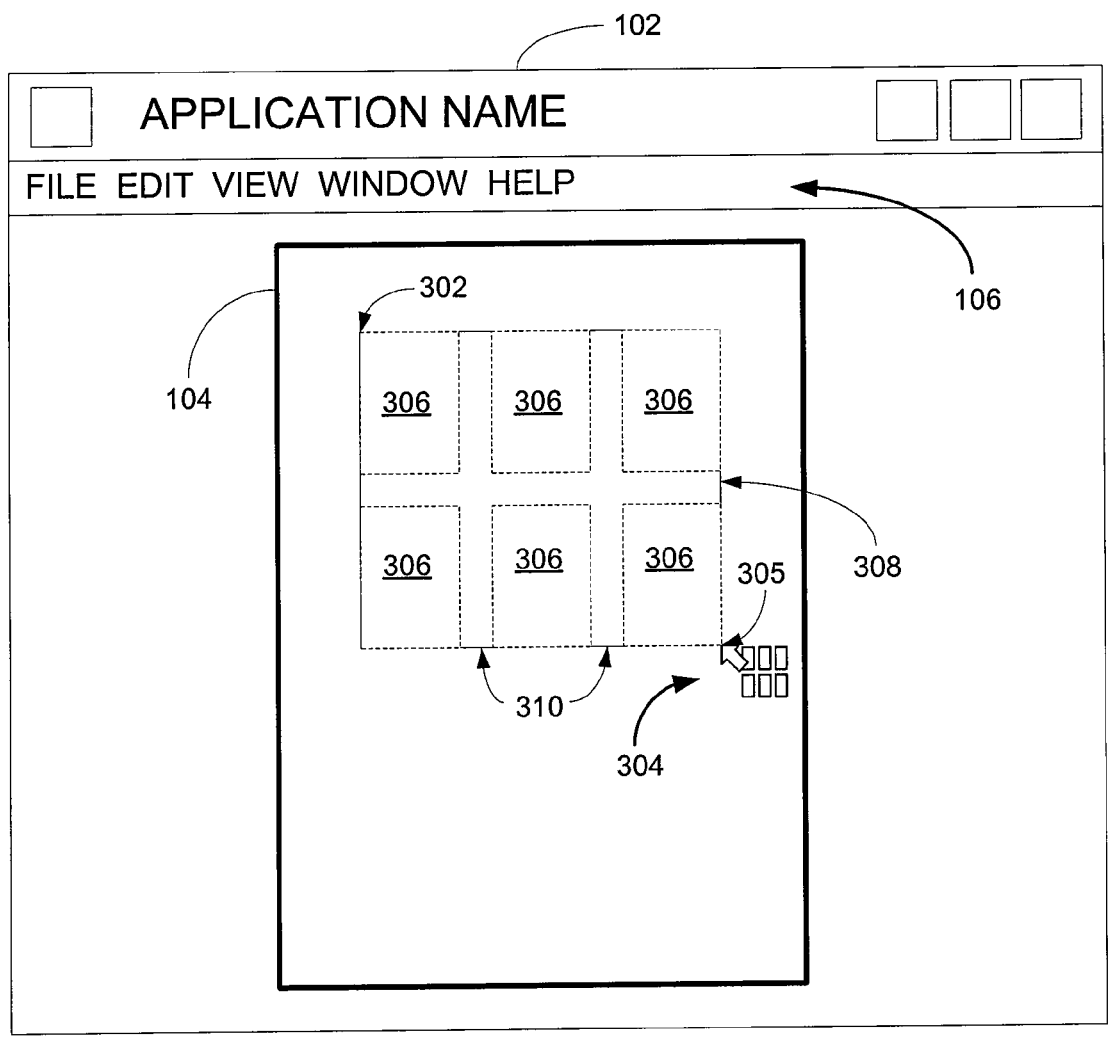
FIG. 3 is an illustration of a document authoring user interface of a document authoring application according to an example embodiment.

FIG. 3 is an illustration of a document authoring user interface 102 of a document authoring application according to an example embodiment. The document authoring user interface 102 is the same as that of FIG. 1, but in an altered state after the triggering input is received. Note that the pointer 304 is in a state indicative that the document authoring user interface 102 is in a state for placement of the electronic files. The pointer 304 is merely an example of how the pointer may appear. In some embodiments, the pointer may include a representation of one or more electronic files selected for placement within the file listing user interface 202 of FIG. 2.

When the document authoring user interface 102 is in a state allowing placement of the electronic files, the user designates an area 308 of the document 104 where electronic files are to be placed. To designate the area, in some embodiments, the user manipulates a gesturing device, such as a mouse, to move the pointer 304 to a location 302 of a starting point of the area 308 where the electronic files are to be placed, clicks a button of the gesturing device and drags the pointer to a second location 305 of an ending point of the area 308. Within the area 308, cells 306 are presented indicating where electronic files will be placed, such as when the user releases the button click of the gesturing device.

In some embodiments, the number, size, and spacing of the cells 306 is a default document authoring application setting. In other embodiments, the number, size, and spacing of the cells 306 is in accordance with a last electronic file placing performed by the document authoring application. In further embodiments, a user is able to adjust properties of the cells 306 within the area 308. The adjustable properties may include cell 306 sizes, both horizontal and vertical spacing of the cells 306, and a number of cells 306. In some embodiments, the properties may be adjusted, while the gesturing tool button remains pressed, by key strokes on a keyboard. For example, in some embodiments, the following key strokes may be used to adjust the cell 306 properties:

| Key Stroke | Property Modified |
| --- | --- |
| ← or → | Number of cell 306 columns |
| ↑ or ↓ | Number of cell 306 rows |
| SHIFT + ← or → | Horizontal cell 306 spacing |
| SHIFT + ↑ or ↓ | Vertical cell 306 spacing |
| Page Up or Page Down | Both vertical and horizontal cell 306 spacing |

In some further embodiments, one or more other properties of the cells 306 may also be modified. Such other properties may include opacity or color saturation of the content placed in the cells 306, and a property designating that the cell 306 contents be placed in the foreground or background with regard to other content in the document 104. The other properties may also include one or both of a cell 306 shape and an arrangement of the cells 306 in a manner, such as the rows and columns illustrated in FIG. 3, or in another manner such as a circular arrangement, an arrangement where one or more of the cells 306 are of a differing size with regard to the other cells 306, and other arrangements.

Upon release of the button of the gesturing device, the cells 306 are populated with representations of the selected electronic files by the document authoring application and the pointer 304 returns to a default pointer state. The electronic file representations are automatically scaled to the size of the cells 306. If an electronic file to be placed in a cell 306 is an electronic image file, the representation of the electronic file is the image. If the electronic file is of another file type, the representation may be an icon representing the electronic file, an image of a first page, or otherwise specified page, of the electronic file if the electronic file is a document, or other representation generated as a function of content in the electronic file. In some embodiments, a representation generated as a function of content in the electronic file may include all or a portion of text included in the content of the electronic file. Such content may include text of text, rich text, word processing, spreadsheet, or other electronic files.

The electronic files may be populated to particular cells 306 in various different ways. A default may specify that the electronic files be placed in a manner that matches a language of the document authoring application. For example, if the language of the application is English, the electronic files by default will be placed starting in an upper left-hand corner and moving right and down. Other languages, and thus the document authoring application, may start at the upper right-hand corner and work left and down. In other embodiments, a user may configure, or otherwise specify, an order of how cells are to be populated. Such other orders of how the cells are to be populated may include one or more of sorting by date, alphabetical order, file type, metadata of the electronic files, or other sorting or random distributions.

In some embodiments, where the representations of the electronic files are placed in the cells 306, the electronic files are embedded within the electronic document 104 being authored. In such embodiments where the electronic files are embedded, the electronic files may be later opened and/or exported from the electronic document by selecting the representation, such as by a gesturing tool double-click. In instances where an electronic file placed in a cell is an image, the electronic image file may be placed in the cell as RGB values at specific document 104 coordinates. However, in other embodiments, the image files may also, or alternatively, be embedded in the document. Links to electronic files may also be embedded within the electronic document 104. When links are present, a representation of the electronic file may embedded in the electronic document 104 and the link provides a link to an entirety of the linked electronic file. Alternatively, when the electronic document 104 is opened and displayed, the electronic file may be downloaded based on the link.

In some embodiments, electronic files placed in the document 104 may include metadata descriptive of the file, a storage location of the file, the content of the file, or other text. In some embodiments, when such an electronic file is placed in the document 104, the metadata may also be placed within the cell 306 where the electronic file is placed or in an area around or near the cell 306.

Returning to the placement of the electronic files in the document 104, if the number of unplaced electronic files is greater than the number of cells 306 in the designated area 308, the placed electronic files are removed from the memory, or other data structure maintained to track unplaced images, by the document authoring application, leaving only unplaced electronic files. These remaining electronic files may also be placed, such as is illustrated and described with regard to FIG. 4.

Figure 4:
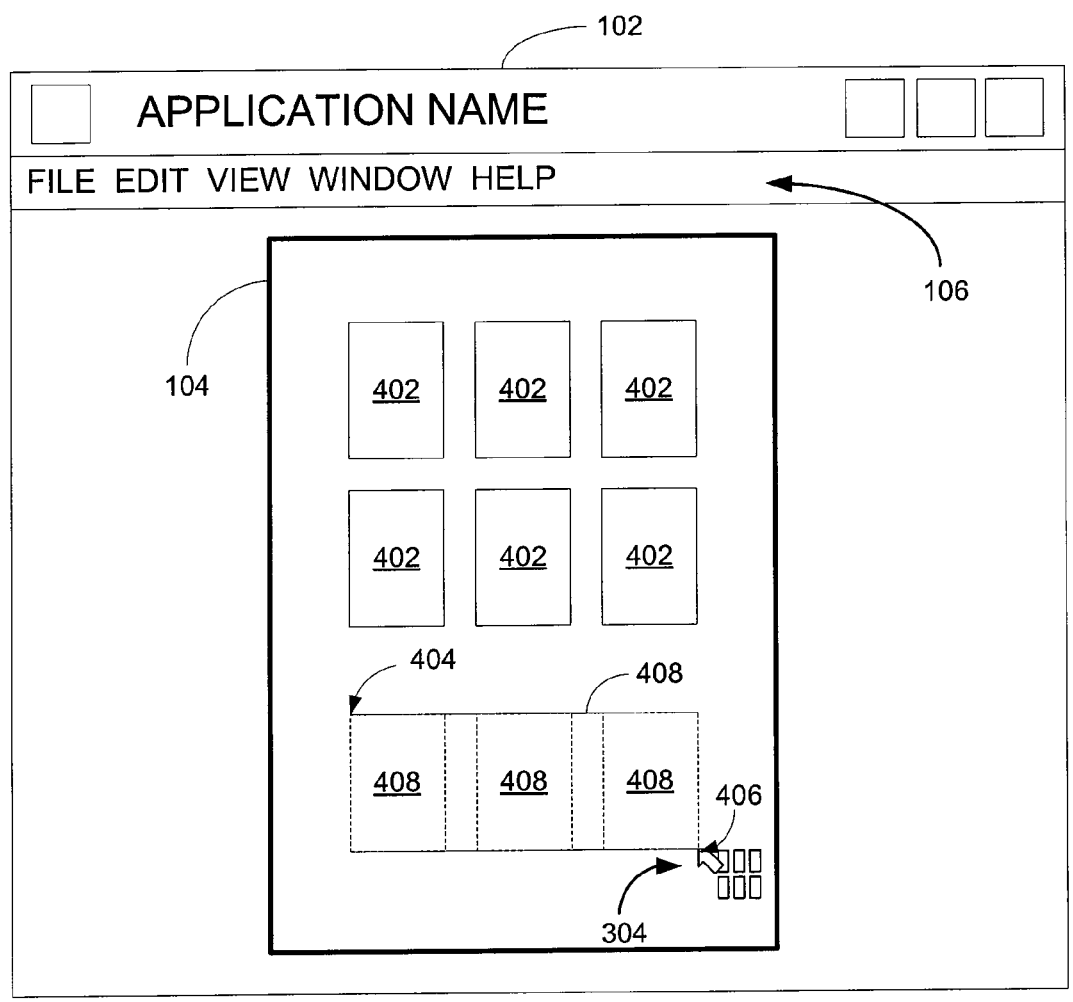
FIG. 4 is an illustration of a document authoring user interface of a document authoring application according to an example embodiment.

FIG. 4 is an illustration of a document authoring user interface 102 of a document authoring application according to an example embodiment. The document authoring user interface 102 is the same document authoring user interface 102 of FIG. 1 and FIG. 3, except with a few modifications. For example, the cells 306 of FIG. 3 are replaced by placed electronic files 402. Further, the document authoring user interface 102 has been placed back into the state to allow the user to add selected electronic files to the document 104. However, rather than placing the electronic files that have already been placed (placed electronic files 402), the document authoring application will place only the unplaced selected electronic files held in memory as files or references to files. As mentioned above, after selected electronic files are placed, the files, or references thereto, are removed from the memory. Thus, the user will select a starting point 404 and an ending point 406 to define a second area 408 for placement of some or all of the remaining selected electronic files or newly selected electronic files. The user may then modify cell 408 properties. However, in some embodiments, the cell 408 properties initially provided as the area 408 is designated are the same as the properties of a most recent placement of electronic files. The electronic files are then placed into the cells 408 as discussed above with regard to FIG. 3.

Figure 5:
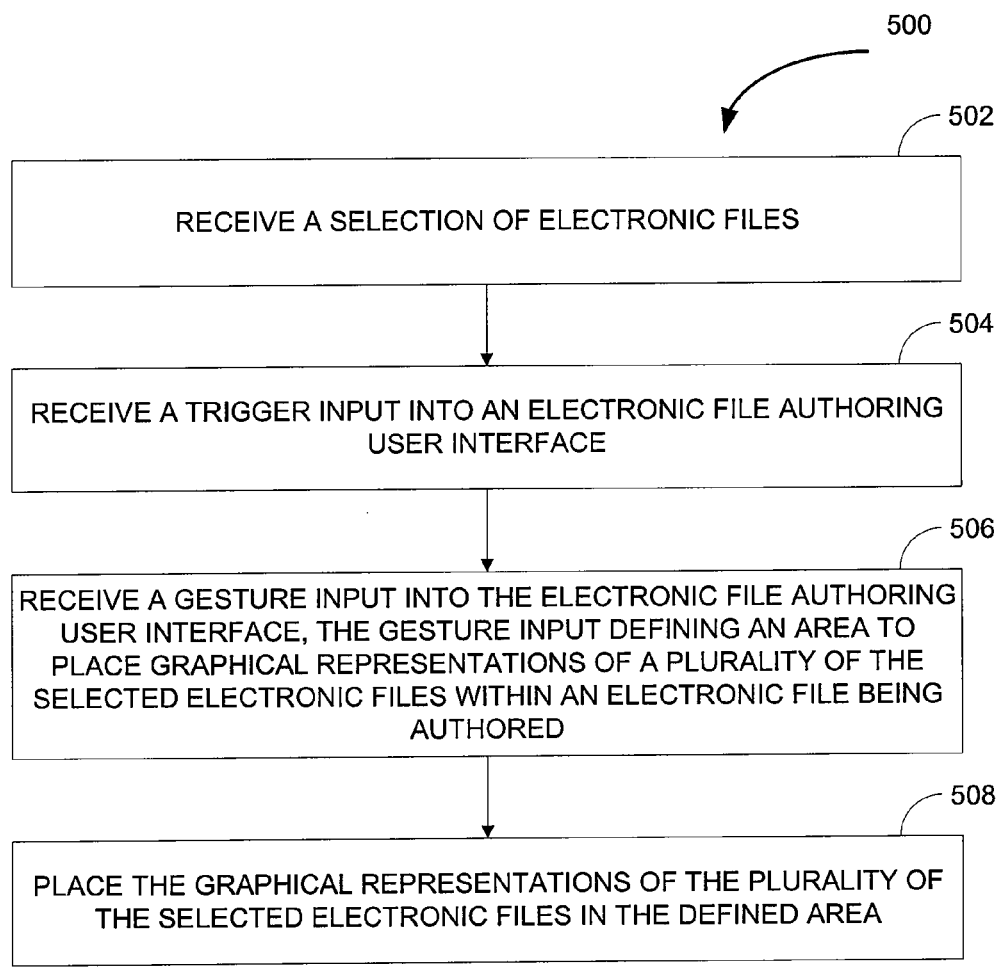
FIG. 5 is a block flow diagram of a method according to an example embodiment.

FIG. 5 is a block flow diagram of a method 500 according to an example embodiment. The method 500 is an example method, which may be performed by a computing device as part of a document authoring or other computer application.

The method 500 includes receiving 502 a selection of electronic files within a file listing user interface and receiving 504 a trigger input into an electronic file authoring user interface. The method 500 further includes receiving 506, into the electronic file authoring user interface, a gesture input defining an area to place a graphical representation of a plurality of the selected electronic files within an electronic file being authored. The method 500 also includes placing 506 the graphical representations of the plurality of selected electronic files in the defined area. The document within which the graphical representations are placed may then be stored, transmitted, displayed, or shared in another manner.

In some embodiments, receiving 502 the selection of electronic files includes importing the selected electronic files into a data structure of the electronic file. In further embodiments, receiving 502 the selection of electronic files within the file listing user interface includes receiving a drag-and-drop of electronic files into a computer application performing the computerized method 500 from a file listing user interface of an operating system of a computer upon which the computer application performing the computerized method is executing In some embodiments of the method 500, the trigger input includes keystroke input from a keyboard device communicatively coupled to a computing device performing the computerized method. The trigger input may also include input defining a number of cells within which to place individual graphical representations of the selected electronic files, a size of the cells, and spacing between the cells within the defined area.

Figure 6:
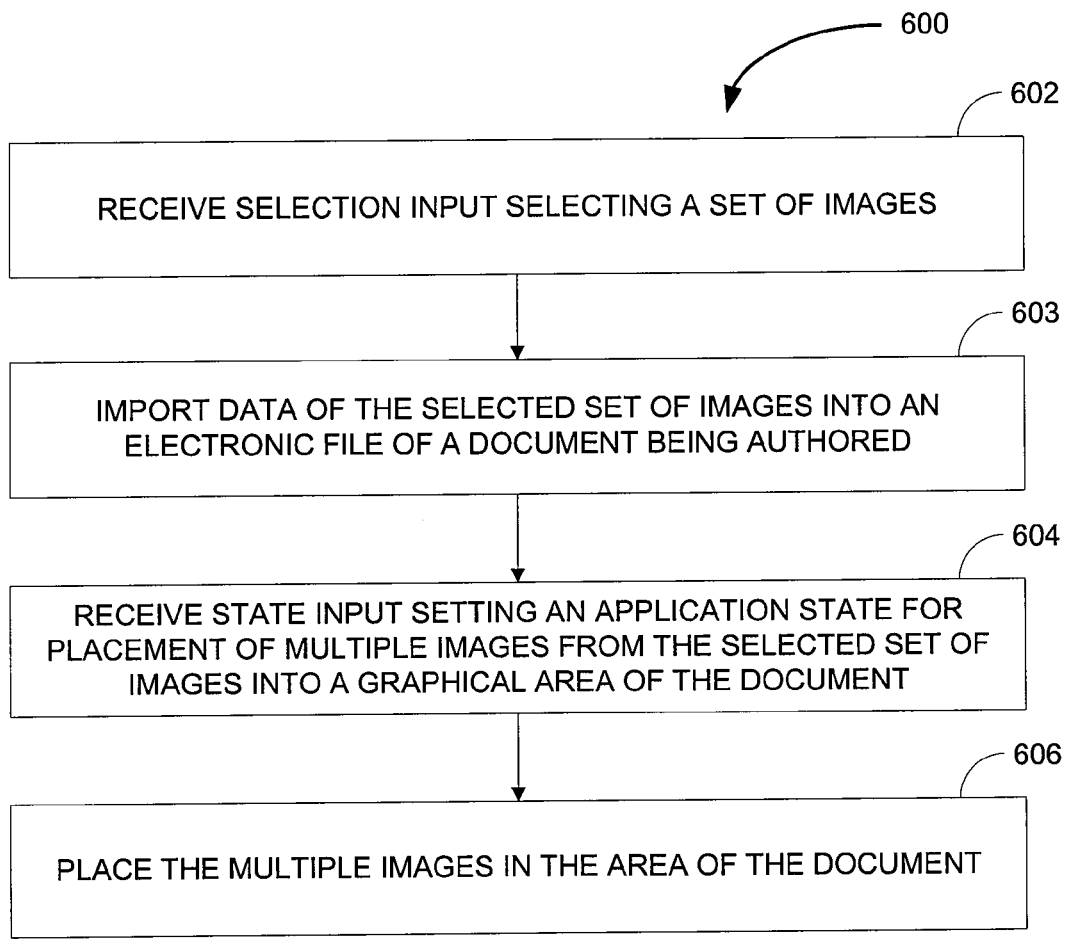
FIG. 6 is a block flow diagram of a method according to an example embodiment.

FIG. 6 is a block flow diagram of a method 600 according to an example embodiment. The method 600 is another example method, which may be performed by a computing device as part of a document authoring or other computer application. The method 600 includes receiving 602 selection input selecting a set of images, importing 603 data of the images from the selected set of images into an electronic file of a document being authored, and receiving 604 state input setting an application state for placement of multiple images from the selected set of images into an area of the document. The method 600 further includes placing 606 the multiple images in the area of the document.

The received 604 input setting the application state includes input received from one or more input devices communicatively coupled to the computing device. This received 604 input may also include input defining properties of an area of the document where the imported 603 images are to be placed 606, such as input defining one or more of a size of the area, one or more cells within the area, a size of each cell, and spacing between the cells.

Importing 603 the data of the images from the selected set of images into the electronic file may include embedding an electronic file of each selected image, or other selected electronic file, within an electronic file of the document being authored. In other embodiments, some or all of the data from each of the selected images, or other selected electronic files, may be embedded within the electronic file of the document being authored.

Placing 606 the multiple images in the area of the document includes placing one image in each cell of a plurality of cells in the area of the document. The images may be resized to fit the cell. If the number of cells within the area is less than a number of images of the selected set of images, some embodiments of the method 600 further include receiving input setting the application for placement of further images from the selected set of images into a second area of the document. The method 600 may then continue by placing the further images from the selected set of images into the second area of the document.

Figure 7:
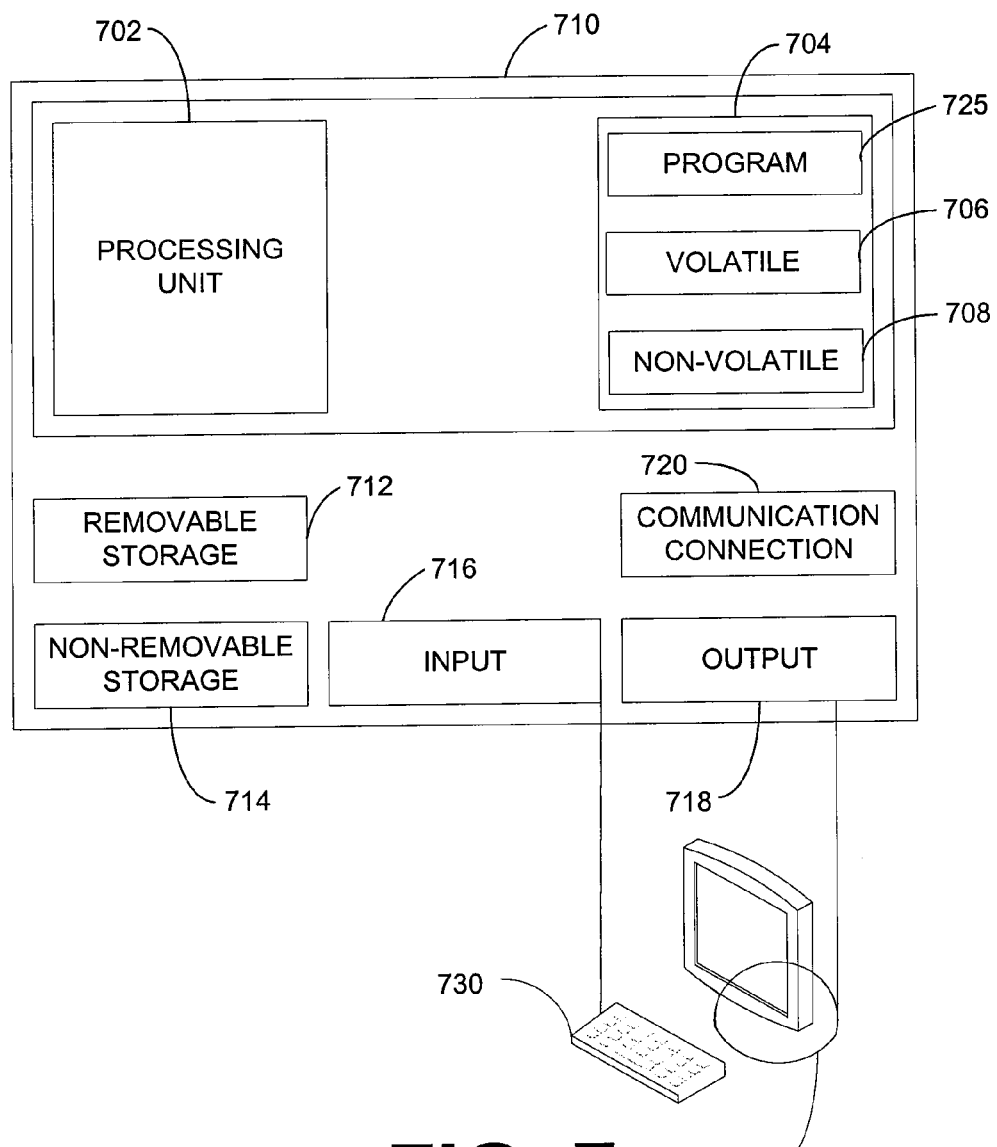
FIG. 7 is a block diagram of a computing device according to an example embodiment.

FIG. 7 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The input 716 may include or be coupled to a keyboard 730 and a gesturing device such as a mouse. The output 718 may include or be coupled to a monitor 732, printer, and other output devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), the Internet, or other networks.

Computer-readable instructions stored on a computer-readable medium are executable by the processing unit 702 of the computer 710. A hard drive, CD-ROM, and RAM are some examples of articles including a computer-readable medium. The computer-readable instructions may include a computer program 725 such as a document authoring application as discussed above.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method comprising:
receiving a selection of a set of images;
importing data of the selected set of images into an electronic file of a document being authored;
while a single electronic file authoring user interface is in a default state, receiving a trigger input into the single electronic file authoring user interface, the trigger input placing the single electronic file authoring user interface in an altered stated for placement of multiple images from the selected set of images within a view of an electronic file being authored, the single electronic file authoring user interface including and providing the view of the electronic file being authored;
while in the altered state for placement of multiple images from the selected set of images, receiving a gesture input into the single electronic file authoring user interface, the gesture input defining an area to place graphical representations of multiple images from the selected set of images within the electronic file being authored, the gesture input further defining a number of cells within which to place individual graphical representations of the images from the selected set of images, a size of the cells, and spacing between the cells within the defined area of the electronic file being authored;
presenting a preview within the single electronic file authoring user interface representative of how the cells defined by the gesture input will appear when placed within the electronic file being authored;
receiving a placement input within the single electronic file authoring user interface to place the graphical representation of the multiple images from the selected set of images in cells to be created within the electronic file being authored according to the presented preview;
in response to the placement input, placing, within the electronic file being authored, the graphical representations of the multiple images from the selected set of images in the defined area within a number of cells that are sized and spaced based on the received gesture input, the placing of the graphical representations including automatically scaling each of the multiple images to a size of the cells and placing the scaled images within respective individual cells;
returning the single electronic file authoring user interface from altered state; and
wherein the trigger input, gesture input, placement input are each received within the single electronic file authoring user interface.

2. The computerized method of claim 1, wherein the receiving of the selection of the set of images includes importing the selected set of images into a data structure of the electronic file.

3. The computerized method of claim 1, wherein the receiving of the selection of the set of images includes receiving a drag-and-drop of electronic files into a computer application performing the computerized method from a file listing user interface of an operating system of a computer upon which the computer application performing the computerized method is executing.

4. The computerized method of claim 1, wherein the layout and trigger inputs include keystroke input from a keyboard device communicatively coupled to a computing device performing the computerized method.

5. The computerized method of claim 1, wherein the area input includes click-and-drag input from a pointing device communicatively coupled to a computing device performing the computerized method, the click-and-drag input defining the area to place the visual representation of the at least one selected image of the set of images.

6. A non-transitory computer-readable medium, with executable instructions thereon to cause a computing device to:
receive selection input selecting a set of images;
import data of the selected set of images into an electronic file of a document being authored;
while a single electronic file authoring user interface is in a default application state, receive state input within the single electronic file authoring user interface setting an application state for placement of multiples images from the selected set of images into a graphical area of the document as presented within the single electronic file authoring user interface, the single electronic file authoring user interface including and providing a view of the graphical area of the document;
while in the application state for placement of multiple images from the selected set of images, receiving a gesture input within the single electronic file authoring user interface, the gesture input defining an area within the single electronic file authoring user interface to place graphical representations of the selected set of images within the graphical area of the document, the gesture input further defining a number of cells within which to place individual graphical representations of the images of the selected set of images, a size of the cells, and spacing between the cells within the graphical area of the document being authored;
present a preview within the single electronic file authoring user interface representative of how the cells defined by the gesture input will appear when placed within the electronic file being authored;
receiving a placement input within the single electronic file authoring user interface to place the graphical representation of the multiple images from the selected set of images in cells to be created within the electronic file being authored according to the presented preview;
in response to receipt of placement input, place the multiple images in the area of the document, the multiple images placed within a number of cells that are sized and spaced based on the received gesture input, the placing of the multiple images including automatically scaling each of the multiple images to a size of the cells and placing the scaled images within respective individual cells;
returning the single electronic file authoring user interface to the default application state from the altered application state; and
wherein the state input and gesture input are received within the single electronic file authoring user interface which presents the document within which the multiple images are placed.

7. The non-transitory computer-readable medium of claim 6, wherein the state input includes input received from one or more input devices communicatively coupled to the computing device.

8. The non-transitory computer-readable medium of claim 6, wherein the input defining properties of the selected area of the document where the images are to be placed further includes input selecting a shape of the cells.

9. The non-transitory computer-readable medium of claim 6, wherein the non-transitory computer-readable medium includes further instructions to:
based on the number of cells within the area being less than a number of images of the selected set of images, receive input setting the application for placement of further images from the selected set of images into a second area of the document; and
place the further images from the selected set of images into the second area of the document.

10. The non-transitory computer-readable medium of claim 9, wherein the placing of the further images into the second area of the document is performed according to the same cell size and cell spacing as previously placed images.

11. A system comprising:
a display, gesture input and keyboard devices, a processor, and a memory device coupled to a bus;
a document authoring application stored in the memory and operable on the processor to:
receive a selection of a set of images;
import data of the selected set of images into an electronic file of a document being authored;
while a single electronic file authoring user interface is in a default state, receive a trigger input into the single electronic file authoring user interface, the trigger input placing the single electronic file authoring user interface in an altered stated for placement of multiple images from the selected set of images within a view of an electronic file being authored, the single electronic file authoring user interface including and providing the view of the electronic file being authored;
while in the altered state for placement of multiple images from the selected set of images, receive a gesture input into the single electronic file authoring user interface, the gesture input defining an area to place graphical representations of multiple images from the selected set of images within the electronic file being authored, the gesture input further defining a number of cells within which to place individual graphical representations of the images from the selected set of images, a size of the cells, and spacing between the cells within the defined area of the electronic file being authored;
present a preview within the single electronic file authoring user interface representative of how the cells defined by the gesture input will appear when placed within the electronic file being authored;
receiving a placement input within the single electronic file authoring user interface to place the graphical representation of the multiple images from the selected set of images in cells to be created within the electronic file being authored according to the presented preview;
in response to the placement input, place, within the electronic file being authored, the graphical representations of the multiple images in the defined area within a number of cells that are sized and spaced based on the received gesture input, the placing of the graphical representations including automatically scaling each of the multiple images to a size of the cells and placing the scaled images within respective individual cells;
returning the single electronic file authoring user interface to the default state from the altered state; and
wherein the trigger input, gesture input, placement input are each received within the single electronic file authoring user interface.

12. The system of claim 11, wherein the representations of the multiple images placed within the document are generated as a function of content within respective electronic image files.

13. The system of claim 11, wherein the document authoring application is further operable on the processor to:
   receive layout input through a combination of two or more keystrokes received via the keyboard, the layout input modifying layout properties within the defined area within the document for placement of the selected set of images.

14. The system of claim 13, wherein the trigger input includes a combination of two or more keystrokes received via the keyboard to place the document authoring application in a state for placement of the selected set of images within the document.

15. The system of claim 13, wherein the layout properties within the defined area include one or more of:
   a number of cells within the defined area within which the multiple images from the selected set of images are placed;
   a cell shape;
   one or more cell dimensions; and
   spacing between the cells when the number of cells is greater than one.

16. The system of claim 11, wherein if placement of the representation of multiple images from the selected set of images places less than all of the selected set of images, the document authoring application is further operable on the processor to:
   maintain data in the memory identifying the remaining selected set of images that have not yet been placed within the document; and
   receive further trigger and gesture input to place representations of the remaining selected set of images.

* * * * *